April 28, 1970  W. D. W. PAYNTER  3,508,617

AGRICULTURAL SOIL TREATING IMPLEMENTS

Filed July 10, 1967

INVENTOR
WILLIAM D. W. PAYNTER

BY
Watson Cole, Grindle & Watson
ATTORNEYS

United States Patent Office 3,508,617
Patented Apr. 28, 1970

3,508,617
AGRICULTURAL SOIL TREATING IMPLEMENTS
William D. W. Paynter, Hook-with-Warsash,
Southampton, England
Filed July 10, 1967, Ser. No. 652,209
Int. Cl. A01b 29/02, 29/06, 27/00
U.S. Cl. 172—68                                    3 Claims

ABSTRACT OF THE DISCLOSURE

A soil treating implement is disclosed the purpose of which is to break down ploughed soil with the minimum of operations. To this end a rotary member, e.g. a smooth cylinder is positively driven over the soil to produce a skidding action either by being driven rearwardly or at a peripheral speed forwardly which is different from that of the speed of bodily forward travel.

This invention relates to an agricultural soil treating emplement. During the preparation of soil, for example prior to sowing of seed, various operations are normally carried out to break down the soil to the required extent depending upon the type of soil and its condition at the time the various operations are to be carried out.

The invention is concerned with providing an implement which will reduce the number of times it is necessary to work the soil in order to break it down after ploughing into a condition suitable for planting or sowing. By providing an arrangement which reduces the number of times a tractor has to cross the soil excessive compaction of the soil is avoided but, at the same time, the arrangement, according to the invention, has other advantages as will appear.

According to the present invention an agricultural soil treating implement comprises an elongated rotary member having its axis lying transverse to a direction of forward travel in which it is arranged to be bodily moved whilst exerting a downward force on the soil, the rotary member being arranged to be positively driven either rearwardly, or at a peripheral speed forwardly which is different from that of the speed of bodily forward travel.

Preferably, the rotary member is rotated rearwardly, i.e. in a direction opposite to that direction in which wheels on the implement or a vehicle which may be towing it rotate to move it in the forward direction. For example, whilst a tractor which may be arranged to tow the implement may have a forward speed of say 2½ miles an hour (4 feet per second), the rotary member may be arranged to rotate in the opposite direction at a speed of, for example, approximately 6 miles an hour (9 feet per second) to give an effective peripheral speed of 8½ miles an hour (13 feet per second).

When the member is driven forwardly it may be desirable to keep the peripheral speed lower than the forward speed in order to obtain the best effect. However it has been found that a desirable effect is obtained where the member is driven forwardly or rearwardly in any manner except that in which the member is rotating forwardly at a peripheral speed which is the same as the speed of forward travel. Thus an effective arrangement is obtained with a cylindrical roller which is rotating forwardly at a speed which may be considerably faster than the speed of forward travel.

The rotary member may comprise a smooth roller, for example, of 18" or 24" in diameter and approximately 7' long.

Figure 1:
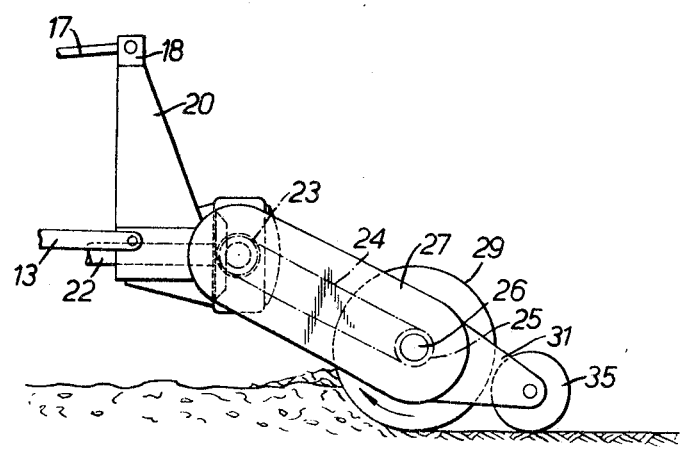
Figure 2:
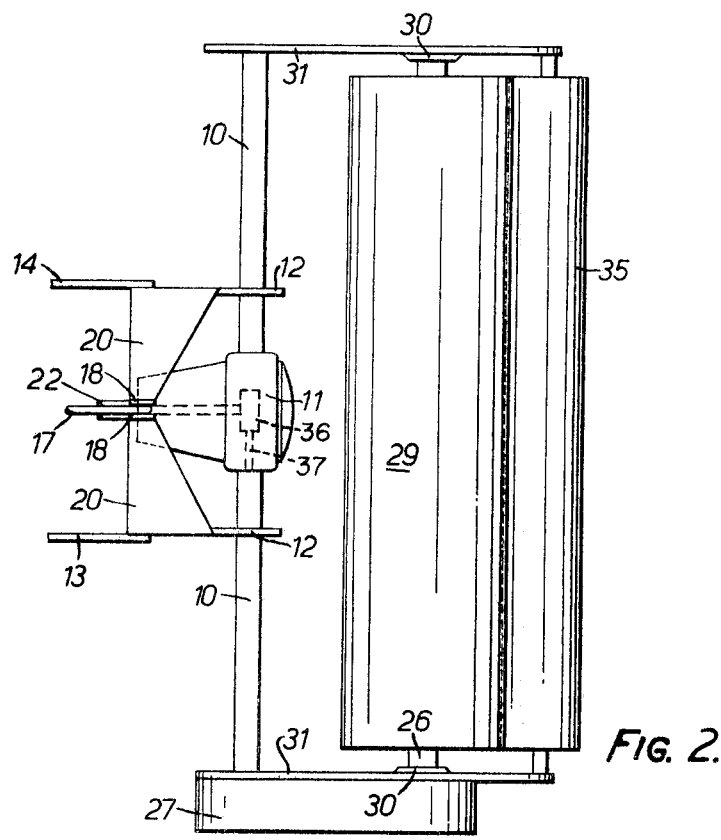

The invention may be carried into practice in a number of ways but one specific embodiment will now be described by way of example with reference to the accompanying drawings, in which:

FIGURE 1 is a side elevation of an implement according to the invention, and
FIGURE 2 is a plan view thereof.

The drawings disclose an implement suitable for attachment to a three point hydraulic linkage on a standard tractor. For this purpose, the implement comprises a transverse frame comprising two length 10 of 4" steel tube extending transversely to the direction of travel and joined at adjacent ends to a 3:1 reduction bevel gear box 11. Each tube has a forwardly extending plate 12 for one of the two lower linkage arms 13 and 14 extending from the tractor. The third or upper linkage arm 17 of the tractor is secured to adjoining vertical portions 18 of a pair of triangular plates 20 which are welded to the upper edges of the plates 12 and which extend upwardly and inwardly towards one another to meet on the median fore and aft line of the implement. The gear box 11 is arranged to receive the power take off 22 of the tractor through a universal joint 36 and to drive a transmission shaft 37 in one of the tubes 10, this shaft extending to the end of the tube and carrying a sprocket 23 forming part of a chain drive 24 to a further sprocket 25 mounted to the rear of the first, and in the same plane, on the end of a shaft 26 to which is secured a horizontal roller 29. The chain and sprocket drive is covered by a chain case 27. The roller shaft 26 is supported at each end in bearings 30 carried by side plates 31 extending rearwardly and downwardly from the outer ends of the main supporting tubes 10. In the example being described, the roller 29 is 7' long, is 18" in diameter and has a weight of, for example, 60 lbs. to 90 lbs. per foot of its length. The chain drive is arranged to impart no reduction in the example shown but in some circumstances it may impart a further reduction of say 2 to 1 so that there may be an overall reduction of 6 to 1 from the power take off of the tractor. The chain drive is arranged to drive the roller 29 in the direction of the arrow in FIGURE 1 i.e. in the opposite direction to that in which it would normally roll if allowed to roll freely, i.e. in the opposite direction to the direction of rotation of the wheels of the tractor.

The side plates 31 in the embodiment shown extend rearwardly of the roller 29 and carry a freely rotating depth control roller 35 for example of 9" diameter. The depth at which the roller 35 runs can be controlled by lengthening or shortening the top linkage arm 17.

Apart from this the roller 29 is allowed to apply substantially its whole weight to the soil over which it passes and thus in practice the roller is, in fact, endeavouring to draw the tractor backwards but being a smooth cylinder and being driven at a suitable low speed the tractor is nevertheless driven in a forward direction of, for example, 3½ miles an hour i.e. approximately 5 feet per second. With a power take off speed of 540 r.p.m. the peripheral speed of the 18" diameter roller is approximately 14 feet per second but in the reverse direction giving an effective skidding speed with respect to the ground over which the roller is passing of approximately 19 feet per second.

In this way, therefore, the roller is rotating upwardly on its leading side and, therefore, tends to compress soil by 2 or 3 inches as it approaches it but at the same time, due to the skidding action on the soil, it crumbles it as well as compresses it. In addition, due to the length of the roller, a certain lateral displacement of soil can take place along its length to produce a levelling effect, although, in order to prevent side spill of soil, side acreens may be provided which project forwardly of the roller 29 on each side. It will be understood that the roller is always rotating relatively to the soil and, therefore, despite the skidding action, it does not became worn at any one part of its circumference which would be the case if it were merely a dragging bar, for example if its axle was locked.

It is to be understood that forward rotation of the roller at a peripheral speed higher than the speed of forward travel will obtain a rather different effect than that obtained with arrangements that either have the roller rotating rearwards or rotating at a peripheral speed forwardly which is lower than the speed of forward travel since, whilst these other proposals ensure a skidding action wherein the leading side of the roller will always be rotating upwards, in an arrangement where the roller is rotating forwardly faster than the speed of travel the leading side of the roller will, of course, be rotating downwards, thereby tending to displace soil rearwardly rather than forwardly. However, a desirable effect is nevertheless obtained with soils in certain conditions since the skidding effect still causes a crumbling of the soil and, apart from compression due to the load of the roller, a lateral levelling effect is obtained as with the other modes of rotation.

Various advantages of the implement have already been referred to but it can also be stressed that with certain types of soil, and particularly in dry climates, the simultaneous breaking down and firming action avoids drying out which tends to occur with disc harrowing or "combing" of the soil.

What I claim as my invention and desire to secure by Letters Patent is:

1. An agricultural soil compacting implement comprising a smooth elongated rotary member supporting said implement directly on the ground over which it is to be towed, a depth control roller mounted onto said rotary member in contact with the ground for controlling the depth of said rotary member, an axle extending through said member and rotatable therewith in a direction transverse to the direction of forward travel, frame means for mounting said axle at both ends to a towing tractor, a gear box and a transmission means on said frame means serving to rotate said rotary member at such a peripheral speed and in a rotary direction which together insure a skidding of the roller surface with respect to the ground, thereby crumbling the soil over which it travels, as well as compressing it.

2. An implement as claimed in claim 1 wherein such gear box and transmission means serve to rotate said rotary member in a direction opposite to the direction of the tractor wheels.

3. An implement as claimed in claim 1 wherein said gear box and transmission means serve to rotate said rotary member in the same direction as that of the tractor wheels and at a different peripheral speed with respect thereto.

References Cited

UNITED STATES PATENTS

| | | | |
|---|---|---|---|
| 66,861 | 7/1867 | Mains | 172—539 X |
| 980,484 | 1/1911 | Bradley | 172—52 |
| 1,337,241 | 4/1920 | McLeod | 172—537 X |
| 3,133,598 | 5/1964 | Caldwell | 172—51 |

ROBERT E. PULFREY, Primary Examiner

W. J. CONLON, Assistant Examiner

U.S. Cl. X.R.

172—52, 71, 118